United States Patent Office 3,516,990
Patented June 23, 1970

---

3,516,990
13-ALKYL-5α-GONANEDIYL-BIS(N-ALKYL-N-HETEROCYCLIC HALIDES)
Daniel M. Teller, King of Prussia, George H. Douglas, Chester, and Herchel Smith, Wayne, Pa., assignors to American Home Products Corporation, New York, N.Y., a corporation of Delaware
No Drawing. Filed Oct. 17, 1966, Ser. No. 586,949
Int. Cl. C07c *173/00*
U.S. Cl. 260—239.5     5 Claims

ABSTRACT OF THE DISCLOSURE 3- and 16- or 17-bis-quaternary ammonium salts of racemic and optically active 1-steroids are prepared and found to be physiologically active as muscle-relaxing agents.

---

This invention relates to and has for its objects the provision of new physiologically active compounds and the novel processes for their production.

More particularly this invention relates to steroids selected from the group consisting of those having the formulae

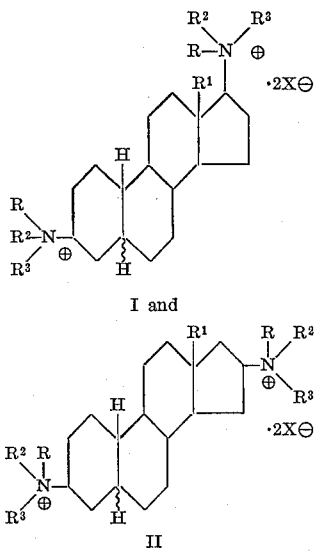

I and

II wherein (↕) represents the alpha or beta position; R is an alkyl group of less than eight carbon atoms; $R^1$ is an alkyl group of less than five carbon atoms; $R^2$ and $R^3$ are each alkyl groups of less than four carbon atoms or together with the nitrogen atom to which they are joined; $R^2$ and $R^3$ is a monocyclic heterocyclic group containing from four to five carbon atoms; and $X^\ominus$ is a physiologically acceptable anion, such as chloride, iodide, bromide and hydroxide.

The term "alkyl" is meant to include branched as well as straight chain groups.

The final products of this invention are physiologically active substances which possess muscle relaxant properties. Hence, the compounds of this invention may be used in lieu of curare.

The compounds may be formulated for such administration, the concentration and/or dosage being based on the activity of the particular compound and the requirements of the patient.

To prepare the compounds of this invention, compounds of the formula

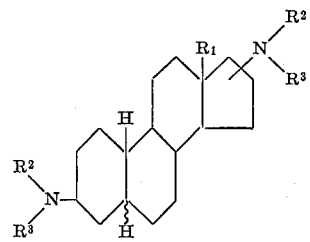

III wherein $R^1$, $R^2$ and $R^3$ are as hereinbefore defined and

groups are in the 3- and 16- or 17-positions, are reacted with an alkyl halide having less than eight carbon atoms, in a suitable organic solvent, to yield the final products of this invention in the form of their halide. If a hydroxide is desired, the halides are then treated in any conventional manner such as with silver hydroxide in an aqueous solution.

The starting materials may be prepared by any conventional method, such as the process described in South African Pat. No. 63/940 published Sept. 3, 1962 of May and Baker Ltd. including 3β,17β-bis(1-pyrrolidinyl)-5α-estrane;
3β,17β-bis[di(lower alkyl)amino]-5α-estrane;
3β,16β-bis(1-pyrrolidinyl)-5α-estrane;
3β,16β-bis[di(lower alkyl)amino]-5α-estrane;
3β,17β-bis(1-piperidino) 5α-estrane;
3β,17β-bis(1-morpholino)-5α-estrane;
3β,16β-bis(1-piperidino)-5α-estrane;
3β,16β-bis(1-morpholino)-5α-estrane;
13-lower alkyl-3β,17β-bis(1-pyrrolidinyl)-5α-gonane;
13-lower alkyl-3β,17β-bis(1-piperidino)-5α-gonane;
13-lower alkyl-3β,17β-bis(1-morpholino)-5α-gonane;
13-lower alkyl-3β,17β-bis[di(lower alkyl) amino]-5α-gonane;
13-lower alkyl-3β,16β-bis(1-pyrrolidinyl)-5α-gonane;
13-lower alkyl-3β,16β-bis(1-piperidino)-5α-gonane;
13-lower alkyl-3β,16β-bis(1-morpholino)-5α-gonane; and
13-lower alkyl-3β,16β-bis(1-di(lower alkyl)amino)-5α-gonane.

The following examples illustrate the invention (all temperatures being in centigrade):

EXAMPLE 1

1,1'-(d-5α-estrane-3β,17β-diyl)-bis(1-methylpyrrolidinium iodide) monohydrate (A) Preparation of d-3β,17β - bis(1-pyrrolidinyl)-5α-estrane.—A solution of 2.70 gm. of d-5α-estran-3-one-17β-ol in 50.0 ml. of acetone is cooled to 0° and 3.70 ml. of 8 N chromic acid is added. Stirring at 0° is continued for 15 minutes and excess isopropyl alcohol is added. The mixture is then filtered through Celite, diluted with benzene, washed with saturated aqueous sodium bicarbonate, brine, dried over anhydrous sodium sulfate and the solvent is evaporated in vacuo to yield a gum which crystallized on triturating with methanol. Recrystallizing from methanol yields 2.65 g. of d-3,3-dimethoxy-5α-estran-17-one having a melting point of 125–145° after drying at 65° for 1 hour in vacuo $\lambda_{max.}^{KBr}$ 5.75μ

*Analysis.*—Calcd. for $C_{20}H_{32}O_3$ (percent): C, 74.96; H, 10.06, Found (percent): C, 75.58; H, 9.81.

A mixture of 0.50 g. of d-3,3-dimethoxy-5α-estran-17-one, 3.0 ml. of freshly distilled pyrrolidine and 1.0 ml. of formic acid is heated for 16 hours at 150° in a Paar pressure reactor. The mixture is cooled and poured into 10% aqueous sodium hydroxide. The solution is then extracted with benzene and the extracts washed with saturated aqueous sodium bicarbonate and brine. The solvent is evaporated in vacuo to yield a tan crystalline solid. Recrystallization from acetonitrile yields 0.40 g. of d-3β,17β-bis(1-pyrrolidinyl)-5α-estrane having a melting point of 108–115° and 128–130°; infrared shows no carbonyl absorption; ultraviolet shows no absorption at 220–300 mμ.

*Analysis.*—Calcd. For $C_{26}H_{44}N_2$ (percent): C, 81.18; H, 11.53; N, 7.28. Found (percent): C, 81.32; H, 11.60; N, 7.24.

(B) Preparation of 1,1′-(d-5α-estrane-3β,17β-diyl)-bis-(1-methylpyrrolidinium iodide) monohydrate.—A solution of 0.20 gm. of d-3β,17β-bis(1-pyrrolidinyl)-5α-estrane, 0.30 ml. of methyl iodide and 5.0 ml. of benzene is refluxed for 2 hours. After cooling, ether is added and the resulting precipitate is filtered off. The precipitate is recrystallized from isopropanol to yield 0.20 gm. of 1,1′-(d-5α-estrane - 3β,17β - diyl)-bis(1-methylpyrrolidinium iodide) monohydrate having a melting point greater than 350°;

$\lambda_{max.}^{KBr}$ 2.95

$[\alpha]_D^{240}$ +13.4° (1% in 95% ethanol).

*Analysis.*—Calcd. for $C_{28}H_{50}N_2I_2 \cdot H_2O$ (percent): C, 48.94; H, 7.63; N, 4.08; I, 36.98. Found (percent): C, 49.39; H, 8.34; N, 4.49; I, 36.40.

EXAMPLE 2

1,1′-(1-5α-estrane-3β,17β-diyl)-bis(1-methylpyrrolidinium iodide) monohydrate

Following the procedure of Example 1B but substituting l-3β,17β-bis(1-pyrrolidinyl)-5α-estrane for d-3β,17β-bis(1-pyrrolidinyl)-5α-estrane there is obtained 1,1′-(1-5α-estrane - 3β,17β - diyl)-bis(1-methylpyrrolidinium iodide) monohydrate, $[\alpha]_D^{25}$ —18.3° (1% in 95° ethanol).

*Analysis.*—Calcd. For $C_{28}H_{50}N_2I_2 \cdot H_2O$ (percent): C, 48.98; H, 7.63; N; 4.08; I, 36.98. Found (percent): C, 49.86; H, 7.97; N, 3.67; I, 36.10.

EXAMPLE 3

1,1′-(1-5α-estrane-3β,16β-diyl)-bis(1-methylpyrrolidinium iodide) monohydrate

Following the procedure of Example 1B but substituting l-3β,16β-bis(1-pyrrolidinyl)-5α-estrane for d-3β,17β-bis (1-pyrrolidinyl) 5α-estrane there is obtained 1,1′-(1–5α-estrane-3β,16β-diyl)-bis (1 - methylpyrrolidinium iodide) monohydrate.

EXAMPLE 4

1,1′-(d-5α-estrane-3β,17β-diyl)-bis (1-isopropylpyrrolidinium chloride) monohydrate Following the procedure of Example 1B but substituting isopropyl chloride for methyl iodide there is obtained 1,1′-(d-5α-estrane - 3β,17β - diyl) - bis(1 - isopropylpyrrolidinium chloride) monohydrate.

EXAMPLE 5

1,1′-(1-5α-estrane-3β,17β-diyl)-bis(1-ethylpyrrolidinum chloride) monohydrate

Following the procedure of Example 1B but substituting ethyl chloride for methyl iodide and the 1-form estrane, namely 1-3β,17β-bis(1-pyrrolidinyl)-5α-estrane there is obtained 1,1′-(1-5α-estrane-3β,17β-diyl)-bis(1-ethylpyrrolidinium chloride) monohydrate.

EXAMPLE 6

1,1′-dl-5α-estrane-3β,17β-diyl)-bis(1-butylpyrrolidinium bromide) monohydrate

A solution of 0.40 gm. of dl-3β,17β-bis(1-pyrrolidinyl)-5α-estrane, 1.2 ml. of n-butyl bromide and 10 ml. of benzene is refluxed for 2 hours. The mixture is cooled, ether is added and the resulting precipitate is filtered. The precipitate is recrystallized from isopropanol to yield pure 1,1′-(dl-5α-estrane-3β,17β-diyl)-bis(1 - butylpyrrolidinium bromide) monohydrate.

EXAMPLE 7

1,1′-(d-5α-estrane-3β,16β-diyl)-bis(1-methylpyrrolidinium iodide) hydrate (A) Preparation of d-3,3-dimethoxy-5α-estran-16-one.—To a solution of 0.1 gm. of d-5α-estran-3-one-16β-ol in 5.0 ml. of acetone at 0° is added 0.1 ml. of 8 N Jones reagent. The mixture is stirred at 0° for 15 minutes and excess isopropanol is added. The mixture is filtered through Celite, diluted with benzene, washed with saturated aqueous sodium bicarbonate, water, and the solvent is evaporated in vacuo to yield a colorless solid. Recrystallization of the solid from methanol yields 60 mg. of d-3,3-dimethoxy-5α-estran-16-one having a melting point of 153–156°;

$\lambda_{max.}^{KBr}$ 5.74μ

(B) Preparation of d-3β,16β-bis-(1-pyrrolidinyl)-5α-estrane.—A solution of 0.5 gm. of d-3,3-dimethoxy-5α-estran-16-one in formic acid (98%, 1.0 ml.) and pyrrolidine (3.0 ml.) is heated at 160° for 16 hours in a stainless steel Paar pressure reactor. The mixture is then cooled, diluted with benzene and poured into 10% aqueous sodium hydroxide containing ice. The organic layer is extracted with saturated aqueous sodium bicarbonate, water and the solvent is evaporated in vacuo to yield a tan solid. Recrystallization of the solid from acetonitrile yields 0.45 g. of d-3β,16β-bis-(1-pyrrolidinyl)-5α-estrane having a melting point of 85–100°;

$\lambda_{max.}^{KBr}$ 3.65μ

(C) Preparation of 1,1′-(d-5α-estrane-3β,16β-diyl)-bis-(1-methylpyrrolidinium iodide) monohydrate.—A solution of 0.25 gm. of d-3α,16α-bis(1-pyrrolidinyl)-5α-estrane and 0.35 ml. of methyl iodide in 7.0 ml. of benzene is refluxed for two hours. The mixture is then cooled, diluted with ether and filtered to yield 0.37 gm. of 1,1′-(d-5α-estrane - 3β,16β - diyl) - bis(1 - methylpyrrolidinium iodide) monohydrate having a melting point of 250–270° (dec.).

*Analysis.*—Calcd. for $C_{28}H_{50}N_2I_2 \cdot H_2O$ (percent): C, 48.98; H, 7.63; N, 4.08; I, 36.98. Found (percent): C, 50.66; H, 7.30; N, 4.31; I, 35.30.

Similarly by treating d-3β,16β-bis(1-pyrrolidinyl)-5α-estrane with other lower alkyl halides, a quaternary ammonium salt will be formed.

EXAMPLE 8

1,1′-(5α-estrane-3β,16β-diyl)-bis(1-methylpiperidinium iodide) monohydrate

Following the procedure of Example 7 but substituting piperidine for pyrrolidine in part B, there is obtained 1,1′-(5α-estrane-3β,16β-diyl)-bis(1-methylpiperidinium iodide) monohydrate.

EXAMPLE 9

1,1′-(5α-estrane-3β,16β-diyl)-bis(1-methylmorpholinium iodide) monohydrate

Following the procedure of Example 7 but substituting morpholine for pyrrolidine in part B, there is obtained 1,1'-(5α-estrane-3β,16β-diyl) - bis(1-methylmorpholinium iodide) monohydrate.

EXAMPLE 10

5α-estrane-3β,16β-diyl-bis(trimethylammonium iodide)

Following the procedure of Example 7 but substituting dimethyl amine for pyrrolidine in part B, there is obtained 5α-estrane-3β,16β-diyl-bis(trimethylammonium iodide).

EXAMPLE 11

1,1'-(13-ethyl-5α-gonane-3β,17β-diyl)-bis(1-methylpyrrolidinium iodide) monohydrate Following the procedure of Example 1B but substituting 13-ethyl-3β,17β-bis(1-pyrrolidinyl)-5α-gonane for d-3β,17β-bis(1-pyrrolidinyl)-5α-estrane there is obtained 1,1'-(13-ethyl-5α-gonane-3β,17β-diyl)-bis(1-methylpyrrolidinium iodide) monohydrate.

EXAMPLE 12

1,1'-(13-propyl-5α-gonane-3β,17β-diyl)-bis(1-methylpyrrolidinium iodide) monohydrate Following the procedure of Example 1B but substituting 13-propyl - 3β,17β - bis(1 - pyrrolidinyl)-5α-gonane for d-3β,17β-bis (1-pyrrolidinyl) - 5α - estrane, there is obtained 1,1'-(13-propyl-5α-gonane-3β,17β-diyl) - bis(1-methylpyrrolidinium iodide) monohydrate.

EXAMPLE 13

1,1'-(13-ethyl-5α-gonane-3β,16β-diyl)-bis(1-methylpiperidinium iodide) monohydrate Following the procedure of Example 1B but substituting 13-ethyl-3β,16β-bis-(1-piperidino)-5α-gonane for d-3β,17β-bis-(1-pyrrolidinyl)-5α-estrane there is obtained 1,1'-(13-ethyl-5α-gonane-3β,16β-diyl)-bis(1-methylpiperidinium iodide) monohydrate.

EXAMPLE 14

1,1'-(13-ethyl-5α-gonane-3β,17β-diyl)-bis(1-methylmorpholinium iodide) monohydrate Following the procedure of Example 1B but substituting 13-ethyl-3β,17β-bis(1-morpholino) - 5α - gonane for d-3β,17β-bis(1-pyrrolidinyl)-5α-estrane, there is obtained 1,1'-(13-ethyl-5α-gonane 3β,17β-diyl)-bis(1-methylmorpholinium iodide) monohydrate.

EXAMPLE 15

13-ethyl-5α-gonane-3β,17β-diyl-bis(methyldiethylammonium iodide) monohydrate

Following the procedure of Example 1B but substituting 13-ethyl - 3β,17β - bis - diethylamino - 5α - gonane for d-3β,17β-bis(1-pyrrolidinyl)-5α-estrane there is obtained 13-ethyl - 5α - gonane - 3β,17β-diyl-bis(methyldiethylammonium iodide) monohydrate.

It is understood that where the 5β-forms of the starting material are available, they may be employed with like results.

It is further understood that either the dl-steroids or the specific d- or l-isomers may be employed with like results.

The invention may be variously otherwise embodied within the scope of the appended claims.

What is claimed is:

1. A compound selected from the group consisting of dl- and l-form steroids having the formula:

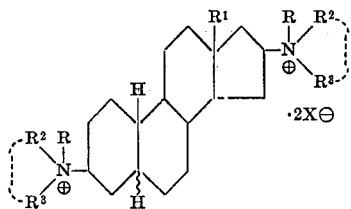

wherein R is a lower alkyl of 1 to 2 carbon atoms; $R^1$ is a lower alkyl of 1 to 3 carbon atoms; $R^2$ and $R^3$ together with the nitrogen atom to which they are joined is a monocyclic heterocyclic group containing 4 to 5 carbon atoms; and $X^\ominus$ is a physiologically acceptable halogen anion.

2. A dl-racemate of claim 1; wherein R is methyl, $R^1$ is ethyl, while $R^2$ and $R^3$ taken together with N represent a monocyclic, heterocyclic group having 4 to 5 carbon atoms; with X representing a physiologically acceptable chloride, bromide, or iodide anion.

3. An l-form steroid of claim 1; wherein $R^1$ is a member of the group consisting of ethyl and propyl.

4. As a compound of claim 1; 1,1'-(l-5α-estrane-3β,16β-diyl)-bis(1-methylpyrrolidinium iodide).

5. As a compound of claim 1; 1,1'-(13-ethyl-5α-gonane-3β,16β-diyl)-bis(1-methylpiperidinium iodide).

References Cited

UNITED STATES PATENTS 3,169,093  2/1965  Davis _____ 167—65

FOREIGN PATENTS 1,305,338  8/1962  France

LEWIS GOTTS, Primary Examiner

E. G. LOVE, Assistant Examiner

U.S. Cl. X.R.

260—239.55, 397, 397.4, 999